United States Patent [19]

Kawasaki

[11] Patent Number: 5,194,998
[45] Date of Patent: Mar. 16, 1993

[54] SIGNAL PROCESSING APPARATUS INCLUDING DEEMPHASIS PROCESSING

[75] Inventor: Somei Kawasaki, Tokyo, Japan

[73] Assignee: Canon Kabushiki Kaisha, Tokyo, Japan

[21] Appl. No.: 417,240

[22] Filed: Oct. 5, 1989

[30] Foreign Application Priority Data

Oct. 11, 1988 [JP] Japan ................................ 63-256315

[51] Int. Cl.⁵ .......................... G11B 5/035; H04N 5/78
[52] U.S. Cl. ...................................... 360/65; 360/33.1; 358/335
[58] Field of Search ................ 360/65, 67, 10.1, 19.1, 360/30, 32, 33.1; 358/320, 328, 336, 337, 340, 335

[56] References Cited

U.S. PATENT DOCUMENTS

| | | | |
|---|---|---|---|
| 3,659,042 | 4/1972 | Kennedy et al. | 360/30 |
| 4,122,502 | 10/1978 | Kobayashi | 360/65 |
| 4,326,223 | 4/1982 | Yamagiwa et al. | 360/33 |
| 4,348,692 | 9/1982 | Ilmer | 360/65 |
| 4,562,492 | 12/1985 | Higurashi | 360/65 |
| 4,597,021 | 6/1986 | Yamamitsu et al. | 360/33.1 |
| 4,638,379 | 1/1987 | Teshima | 360/19.1 |
| 4,658,305 | 4/1987 | Tsushima | 360/65 |
| 4,661,863 | 4/1987 | Ichinoi | 358/330 |
| 4,736,257 | 4/1988 | Watanabe et al. | 360/65 |
| 4,896,220 | 1/1990 | Sato et al. | 358/328 |
| 4,907,181 | 3/1990 | Hedtke et al. | 360/32 |
| 4,908,581 | 3/1990 | Honjo | 358/328 |
| 4,984,102 | 1/1991 | Fujimoto | 360/65 |

Primary Examiner—Stuart S. Levy
Assistant Examiner—Jefferson Evans
Attorney, Agent, or Firm—Robin, Blecker, Daley & Driscoll

[57] ABSTRACT

A signal processing apparatus includes a deemphasis processor, which is arranged to receive a signal which has been emphasis-processed on the basis of a predetermined emphasis characteristic, to separate only a signal of a predetermined frequency band from the received signal, to effect deemphasis-processing of the separated signal on the basis of a deemphasis characteristic corresponding to said emphasis characteristic and then to effect phase-compensation of the signal, thereby restoring an original signal corresponding to the received signal. This apparatus enables stable restoring processing, without being subjected to adverse influence by a noise component.

2 Claims, 12 Drawing Sheets

SIGNAL PROCESSING APPARATUS INCLUDING DEEMPHASIS PROCESSING

BACKGROUND OF THE INVENTION

1. Field of the Invention

This invention relates to a signal processing apparatus for receiving a signal that, when being sent out, has been amplified in a predetermined frequency component on the basis of a predetermined amplification characteristic and restoring the original signal.

2. Description of the Related Art

There has been known the recording and reproducing apparatus for recording image signals or other information signals on the magnetic recording medium such as a magnetic disk and reproducing them from the recording medium.

The conventional type of recording and reproducing apparatus is described by using FIG. 1 below.

Figure 1:
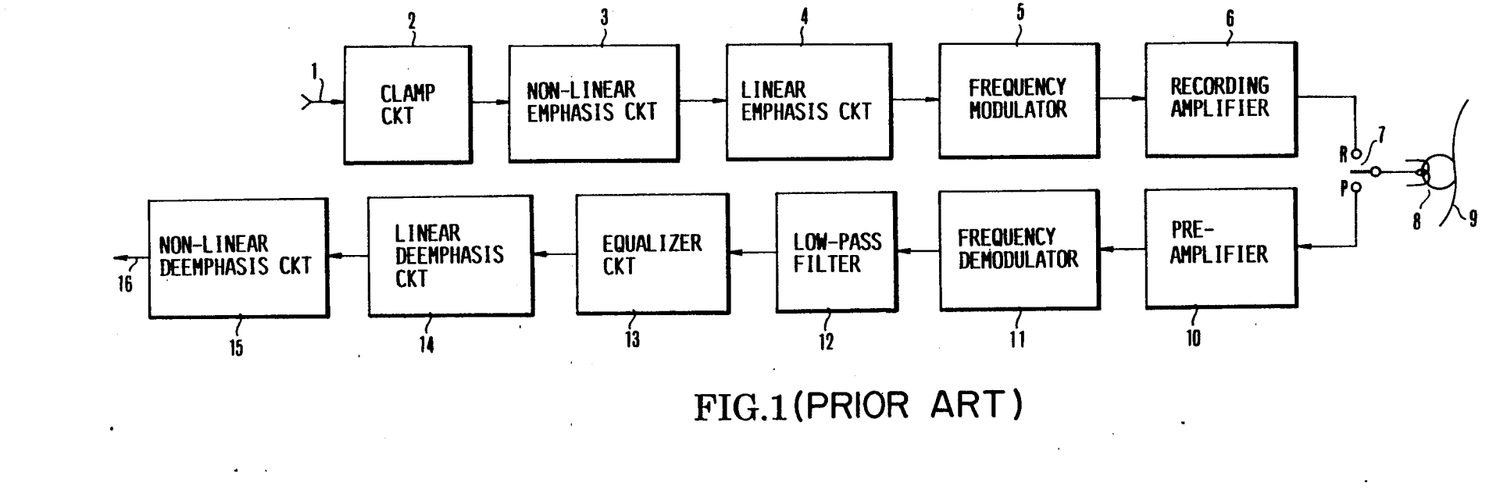
FIG. 1 is a schematic diagram of the construction of the conventional recording and reproducing apparatus.

In FIG. 1 there is shown an example of the apparatus for recording and reproducing luminance signals on and from a magnetic recording medium 9 by using a magnetic head 8. The luminance signal with inclusion of a synchronizing signal enters at an input terminal 1 and goes to a clamp circuit 2 where clamping occurs at the sync. tip portion or the like of the synchronizing signal for the luminance signal. In a non-linear emphasis circuit 3 and a linear emphasis circuit 4, emphasizing is applied to the luminance signal so that the S/N will be improved when the luminance signal is later reproduced. After having been modulated by a frequency modulator 5 and amplified by a recording amplifier 6, the luminance signal passes through a mode selector switch 7 to the magnetic head 8, by which it is recorded on the magnetic recording medium 9. In the reproduction mode, a minute reproduced signal output from the magnetic head 8 passes through the switch 7 to a preamplifier 10 where it is amplified to an adequate level. After having been demodulated by a frequency demodulator 11, a low-pass filter (LPF) 12 removes the superfluous signals. The thus-obtained signal appears at the output of the LPF 12.

Figure 8A:
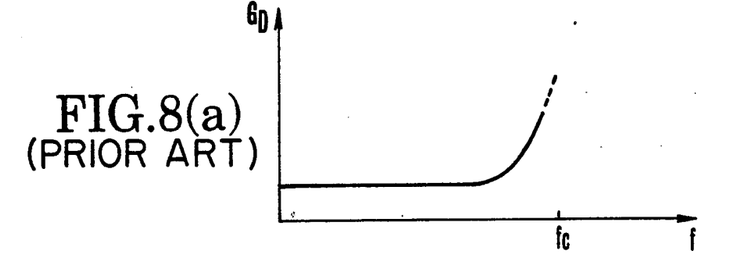
FIG. 8(a) is a graph illustrating the group delay characteristic of the low-pass filter.
Figure 8B:
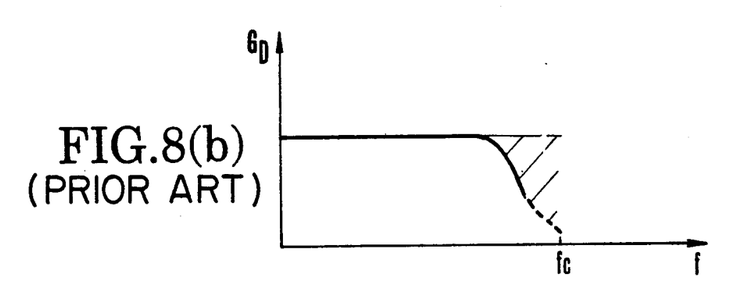
FIGS. 8(b) and 8(c) are graphs illustrating the group delay characteristics of the equalizer circuit.

Since the aforesaid LPF 12 has a group delay characteristic, it is in the neighborhood of its cutoff frequency fc that the group delay time $G_D$ rapidly increases (i.e., an overshoot takes place), as shown in FIG. 8(a). Therefore, an equalizer circuit 13 having an opposite group delay characteristic as shown in FIG. 8(b) to that shown in FIG. 8(a) of the LPF 12 is provided for making flat the apparent group delay characteristic by further processing the output of the LPF 12 through the equalizer circuit 13.

And, the output signal of the equalizer circuit 13 goes to a linear deemphasis circuit 14 having an opposite transfer function to that of the linear emphasis circuit 4 and then to a non-linear deemphasis circuit 15 having an opposite transfer function to that of the non-linear emphasis circuit 3. Thus, the luminance signal is reproduced, appearing at an output terminal 16.

Figure 2:
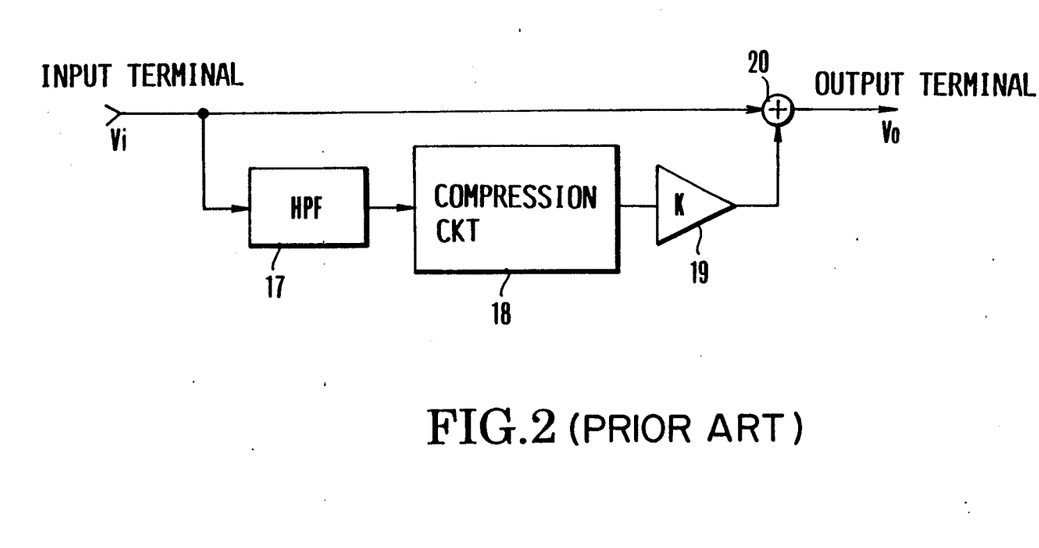
FIG. 2 is a schematic diagram of the conventional non-linear emphasis circuit.
Figure 4:
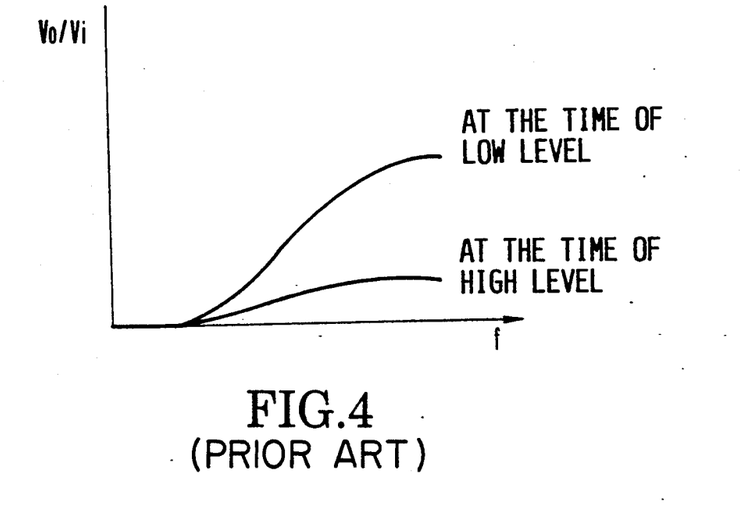
FIG. 4 is a graph illustrating examples of characteristic of the conventional non-linear emphasis circuit.

FIG. 2 shows an example of the construction of the non-linear emphasis circuit 3. The luminance signal from its input terminal, on one hand, enters an adder 20 as it is, and, on the other hand, is routed to a high-pass filter (HPF) 17 where a high-frequency component is extracted out of the luminance signal. The thus-obtained high-frequency component of the luminance signal is compressed at a rate corresponding to the input level in compression circuit 18. After having been weighted by a coefficient multiplier circuit 19, it by now enters the adder 20, being added to the luminance signal being inputted from the input terminal. In such a manner, application of the non-linear emphasizing is performed. It should be noted that this non-linear emphasizing is characterized in that, as shown in FIG. 4, the emphasized quantity vary as different functions between when the level is high and when the level is low.

Figure 3:
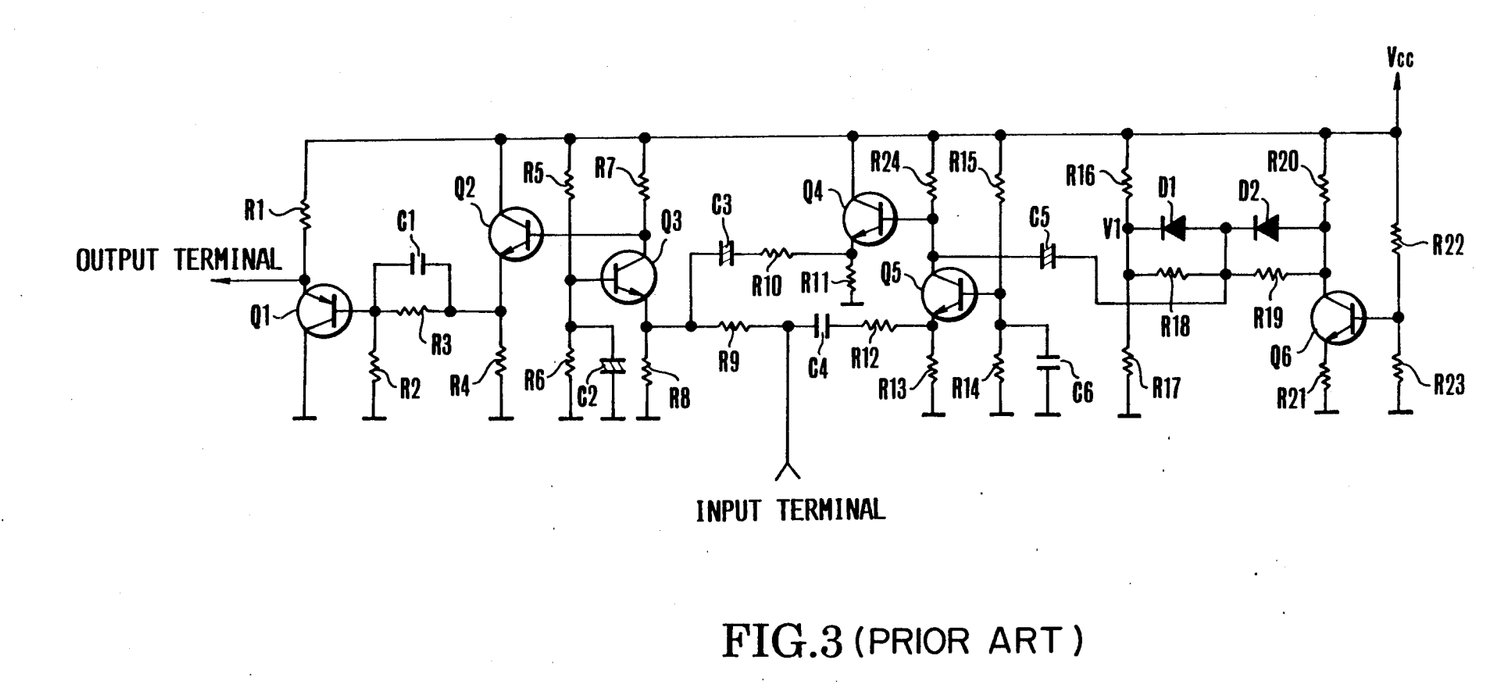
FIG. 3 is a diagram illustrating the details of an example of the construction of the conventional emphasis circuit.
Figure 5:
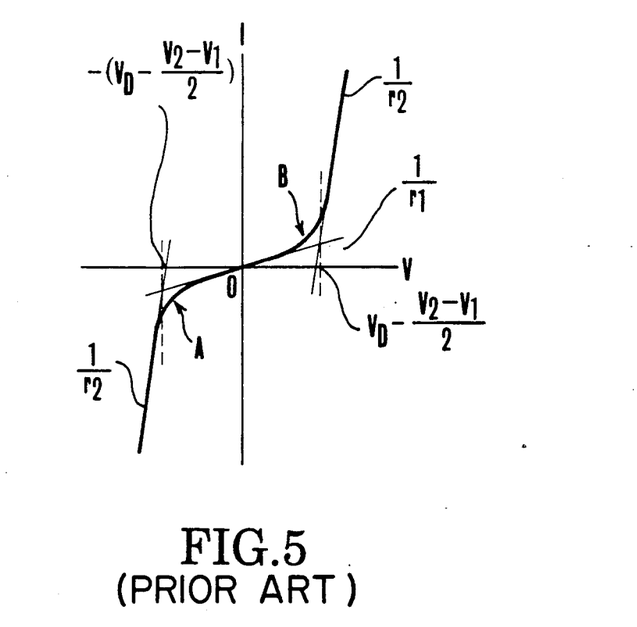
FIG. 5 is a graph illustrating an example of characteristic of the conventional soft limiter circuit.

FIG. 3 exemplifies the construction of the emphasis circuit. To its input terminal, the luminance signal which was clamped at the time of, for example, the sync. tip portion of the synchronizing signal is applied. This input passes through a high-pass filter comprised of a capacitor C4 and a resistor R12 to an amplifier in the base-grounded form of a transistor Q5. To the collector of the transistor Q5, a soft limiter circuit is connected through a capacitor C5, comprising diodes $D_1$ and $D_2$ and resistors R16, R18, R19 and R20. The voltage (V)—current (I) characteristic of this soft limiter circuit is shown in FIG. 5. At the time of the low level, the characteristic is determined by $r_1 = R18 = R19$, while at the time of the high level, the characteristic is determined by $r_2 = R20 = R16//R17$. As a rule, $r_1 > r_2$. This change of the characteristic is expressed by the formula: $V_D - (V_2 - V_1)/2$, where $V_D$ represents the voltage across the turned-on diode $D_1$, $D_2$.

Here, if, as resistors R22 and R23 determine the value of $(V_2 - V_1)$, $R20 = R22 = 2$ is chosen, drift of the value $V_D$ of the diode $D_1$, $D_2$ can be canceled. With the help of a resistor R15, the gain of the amplifier is changed between the different values for the high and low levels by that soft limiter circuit. Thus, these parts constitute the compression circuit 18. The input signal subsequently goes through the emitter follower of a transistor Q4, a resistor R10 and a capacitor C3 to the emitter of a transistor Q3. Meanwhile, the luminance signal from the input terminal is applied through a resistor R9 to that transistor Q3 as a base-gounded type amplifier. The amplified signal passes through the emitter of a transistor Q2 to the linear emphasis circuit 4 comprised of a capacitor C1 and resistors R2 and R3 and therefrom through the emitter follower of a transistor Q1 to the output terminal.

By the way, a value of the coefficient K of the coefficient multiplier circuit 19 of FIG. 2 is determined, in the instance of FIG. 3, depending on the values of resistance of the R12, R15, $r_1$, $r_2$ and R10 and others.

Figure 6:
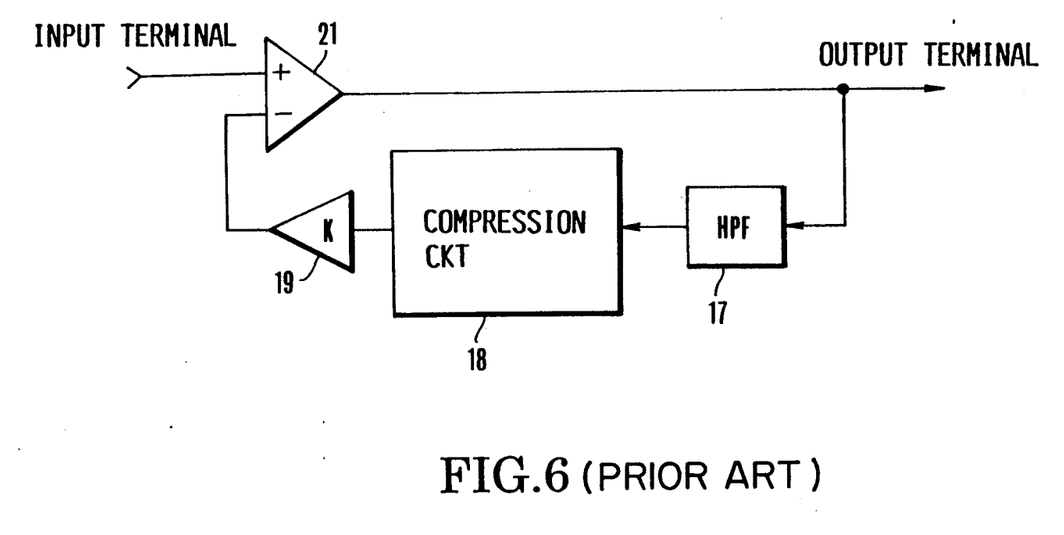
FIG. 6 is a schematic diagram of the construction of the conventional non-linear deemphasis circuit.

FIG. 6 shows an example of the construction of the non-linear deemphasis circuit 15.

For this case, if the level at the input terminal of FIG. 2 and the level at the output terminal of FIG. 6 are equalized to each other, the transfer function of the compression circuit 18 becomes equal, so it can be said that, if the gain of the open loop of a differential amplifier 21 is sufficiently large, the transfer function of the non-linear deemphasis circuit 15 is equal to the reciprocal of the transfer function of the non-linear emphasis circuit 3.

Figure 7:
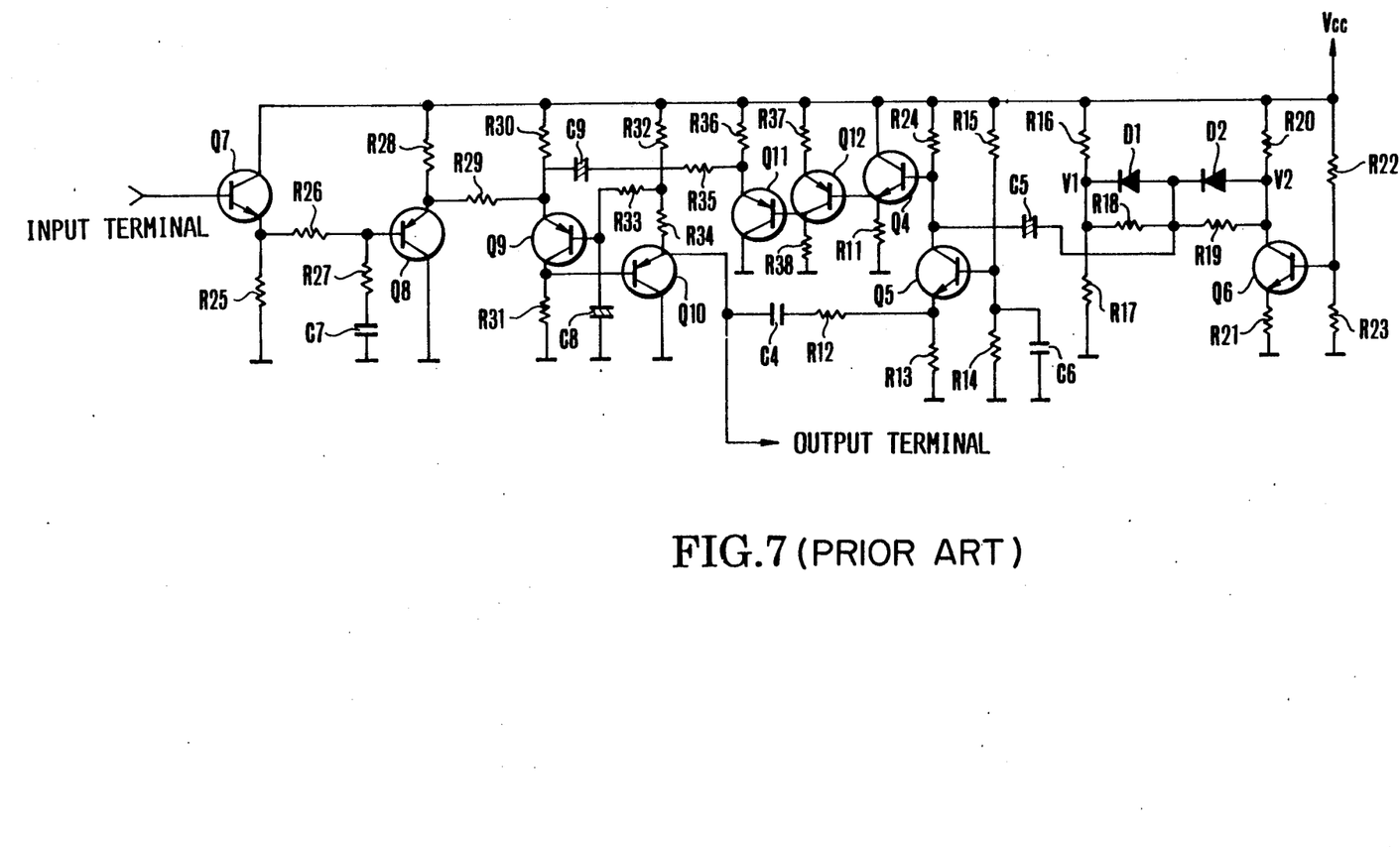
FIG. 7 is a diagram illustrating the details of an example of the construction of the conventional non-linear deemphasis circuit.

FIG. 7 exemplifies the construction of the deemphasis circuit including the non-linear deemphasis circuit of FIG. 6. The reproduced luminance signal output from the frequency demodulator 11 is applied to the base of a transistor Q7, first passing through the linear deemphasis circuit which is formed with resistors R26 and R27 and a capacitor C7 and has the reverse characteristic to the linear emphasis characteristic, wherein non-linear de-emphasizing is applied by an amplifier of a transistor Q9. The thus-reproduced luminance signal appears at the emitter of a transistor Q10. To the emitter of the transistor Q10, a quite similar circuit of a high-pass filter and a compression circuit to the emphasis circuit of FIG. 3 is connected so that a signal component having the non-linear emphasis characteristic is produced at the emitter of the transistor Q10.

This signal is placed to the emitter of a transistor Q11 by an inverting amplifier of a transistor Q12, and therefrom applied through a resistor R35 to the emitter of a transistor Q9, thus forming a negative feedback loop for the non-linear emphasis section. By resistors R37, R38 and R35 and others, the value of the feedback coefficient becomes equal to the value of the coefficient K in the non-linear emphasis circuit.

By the way, in the apparatus of the character described above, to achieve a valuable increase of the resolution on the recording of the luminance signal, the carrier frequency of the frequency-modulated luminance signal to be recorded must be increased. But, because the electromagnetic conversion characteristics at the boundary between the magnetic head and the magnetic recording medium gets more deteriorated toward higher frequency bands, the edge portion of the reproduced signal has a conspicuous noise level as compared with the flat portion, contributing to an obstacle in the way of recording and reproducing video signals with a higher image quality.

SUMMARY OF THE INVENTION

An object of the present invention is to provide a signal processing apparatus which enables the above-described problem to be solved.

Another object is to provide a signal processing apparatus which can restore the stable signal without suffering the influence of the noise component.

Under such objects, according to the present invention, in an embodiment thereof, a signal processing apparatus of the invention is of the type that a signal that, when being sent out, has been emphasis-processed on the basis of a predetermined emphasis characteristic is received and its original signal is restored and output, and is provided with:

separating means for separating only a signal of a predetermined frequency band from the received signal;

deemphasis means for deemphasis-processing signal separated by the separating means on the basis of a predetermined deemphasis characteristic corresponding to the emphasis characteristic, and outputting the deemphasis-processed signal; and phase compensating means for phase-compensating the signal output from the deemphasis means and outputting the phase-compensated signal.

Yet another object of the present invention is to provide a signal processing apparatus which performs an adaptive treatment to the form of the received signal so that its original signal can be restored in good stability.

Under such an object, according to the present invention, in an embodiment thereof, a signal processing apparatus of the invention is of the type that as a signal that, when being sent out, has been emphasis-processed on the basis of a predetermined emphasis characteristic and then frequency-modulated in different deviations to form a first frequency-modulated signal and a second frequency-modulated signal, the first and second frequency-modulated signals are selectively received and the received one is restored to its original signal to be output, and is provided with:

frequency demodulating means for demodulating the received first or second frequency-modulated signal and outputting the demodulated signal;

separating means for separating and outputting a signal of a predetermined frequency band from the signal output from the frequency demodulating means;

first phase compensating means for phase-compensating the signal output from the separating means which is a signal separated from the signal obtained by demodulating the first frequency-modulated signal, and outputting the phase-compensated signal;

deemphasis means for deemphasis-processing the signal output from the first phase compensating means on the basis of a corresponding predetermined deemphasis characteristic corresponding to the emphasis characteristic, and outputting the deemphasis-processed signal; and second phase compensating means for phase-compensating the signal output from the deemphasis means which is a signal that has been separated from the signal obtained by demodulating the second frequency-modulated signal and, then, has been deemphasis-processed, and outputting the phase-compensated signal.

Other objects than those described above of the invention and its features will be apparent from the following detailed description of embodiments thereof taken in conjunction with the accompanying drawings:

BRIEF DESCRIPTION OF THE DRAWINGS

FIG. 12(a) to FIG. 12(f) are wave forms of the signals in the various portions of the recording and reproducing apparatus shown in FIG. 9.

DETAILED DESCRIPTION OF THE PREFERRED EMBODIMENTS

The present invention is next described by using its embodiments.

Figure 9:
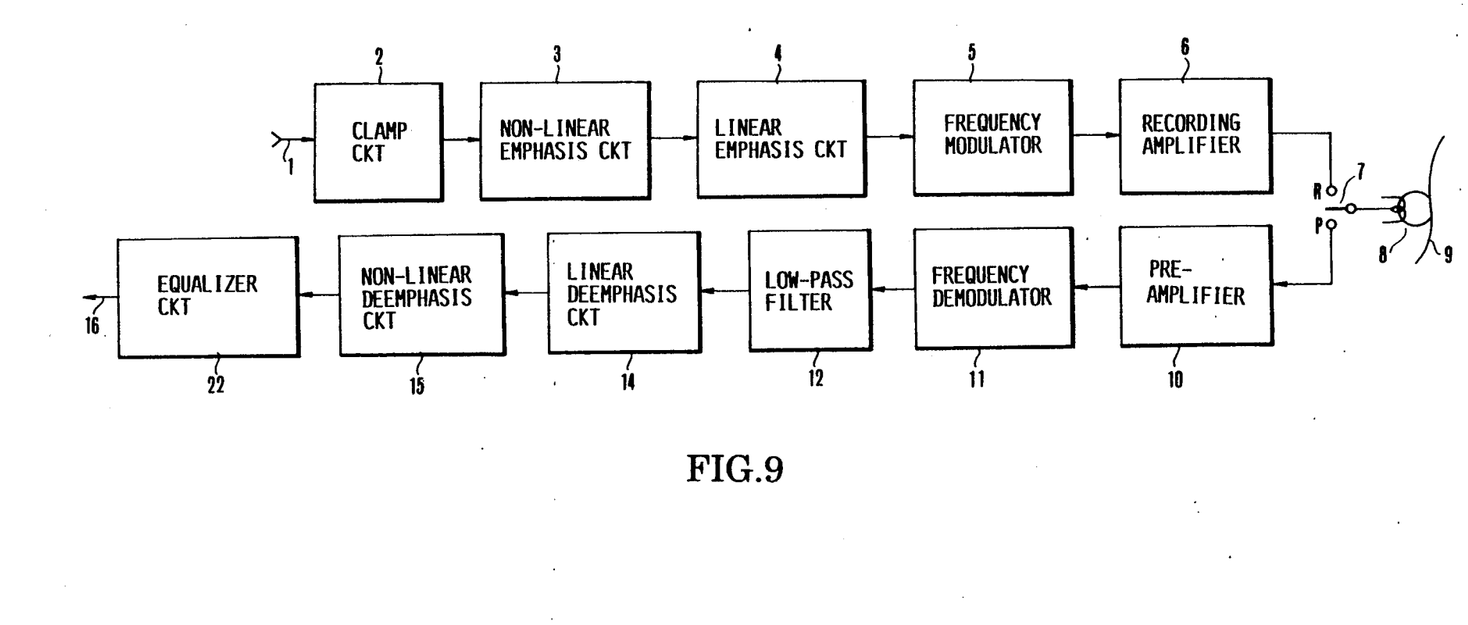
FIG. 9 is a schematic diagram of the construction of a recording and reproducing apparatus to which the invention is applied as an embodiment of the invention.

FIG. 9 schematically shows one embodiment of the invention applied to the recording and reproducing apparatus. Incidentally, in FIG. 9, the similar parts to those shown in FIG. 1 are denoted by the same reference numerals and their detailed explanation is omitted.

As shown in FIG. 9, the present embodiment differs from the conventional example and its characteristic feature resides in that instead of positioning the equalizer circuit 13 just behind the LPF 12, an equalizer circuit 22 is put in the following stage of the non-linear deemphasis circuit 15.

The operation of the reproducing mode of the recording and reproducing apparatus shown in FIG. 9 is described by referring to the wave forms of the signals occurring in the various portions shown in FIGS. 12(a) to 12(f).

Figure 12A:
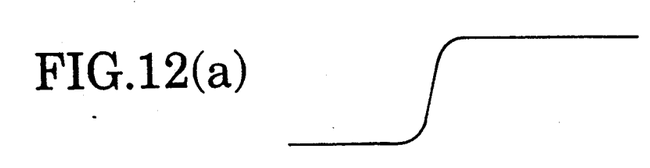

Suppose here, for the purpose of simplifying the explanation, a signal which steeply rose from black level to white level or was of step wave form (see FIG. 12(a)) was recorded on the magnetic recording medium 9 and is to be reproduced from the same medium 9.

The reproduced signal from the magnetic recording medium 9 by the magnetic head 8 is supplied through the switch 7 to the frequency demodulator 11. The signal output from the frequency demodulator 11 is rid of the signals of the superfluous frequency band in passing through the LPF 12 and then supplied to the linear deemphasis circuit 14.

Figure 12B:
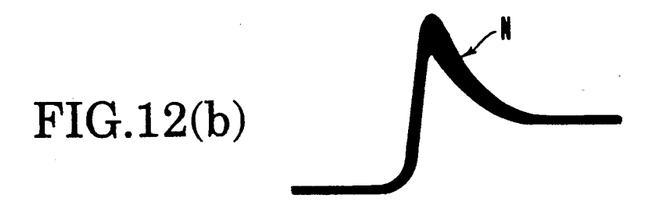

The output signal of the LPF 12 as shown in FIG. 12(b) has a wave form with the noise component (N in this figure) in superimposed relation.

Figure 12C:
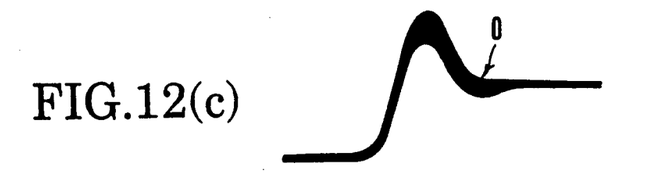

The linear deemphasis circuit 14 produces an output signal of such a wave form as shown in FIG. 12(c). The signal shown in FIG. 12(c), because of its being not yet processed by the equalizer circuit as in the recording and reproducing apparatus shown in FIG. 1, suffers overshooting (in the figure, indicated at O) due to the group delay by the LPF 12.

Figures 12D, 12E:
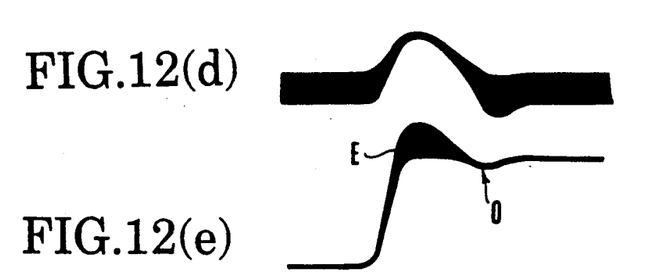

Also, a wave form shown in FIG. 12(d) is of the signal occurring at the output of the compression circuit 18 in the non-linear deemphasis circuit 15. The non-linear deemphasis circuit 15 produces an output signal whose wave form is shown in FIG. 12(e).

As is understood from the wave form of FIG. 12(e), this signal has its noise component conspicuous in the edge portion (indicated at E in the figure) and further an overshooting (indicated at O in the figure), too, is taking place.

Figure 12F:
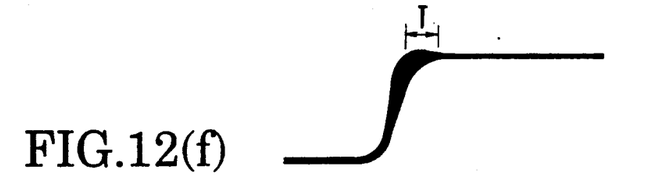

The signal of the wave form shown in FIG. 12(e) is then supplied to the equalizer circuit 22. The equalizer circuit 22 has a group delay characteristic as shown in FIG. 8(b) that compensates the group delay characteristic of the LPF 12. By the equalizer circuit 22, therefore, the noise component is shifted by a period indicated at T in FIG. 12(f). Thus, a signal whose noise component is lessened at the edge portion in such a wave form as shown in FIG. 12(f) is produced.

Figure 8C:
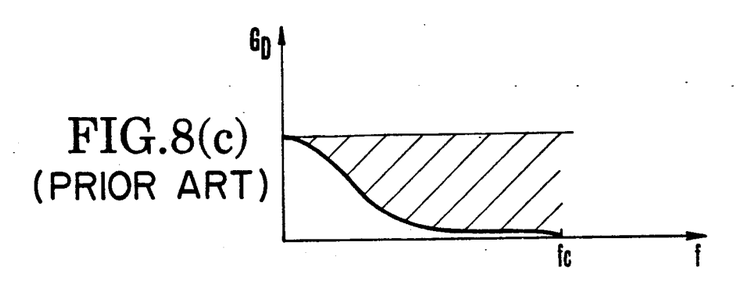
Figure 10:
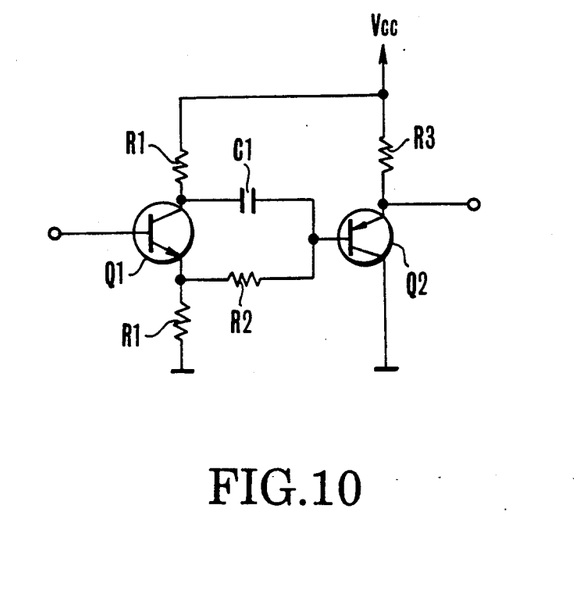
FIG. 10 is a diagram of a concrete example of the construction of the equalizer circuit.

Also, for the group delay characteristic of the equalizer circuit 22, in the case shown in FIG. 8(b), the group delay characteristic of the LPF 12 can perfectly be compensated, but all noise components except ones of the frequency band indicated by hatching in the figure cannot be shifted. On this account, if an equalizer circuit having such a group delay characteristic as shown in FIG. 8(c) is used, the frequency band of the noise components to be shifted is widened. In this case, the magnitude of the noise component in the edge portion of the reproduced signal can further be lessened. The equalizer circuit having the group delay characteristic shown in FIG. 8(c) is possible to realize in a form shown in FIG. 10, wherein the group delay characteristic is determined by the time constant defined by a resistor R2 and a capacitor C1. Incidentally, in FIG. 10, a resistor R1 and the resistor R2 are in relationship of R1>R2.

Figure 11:
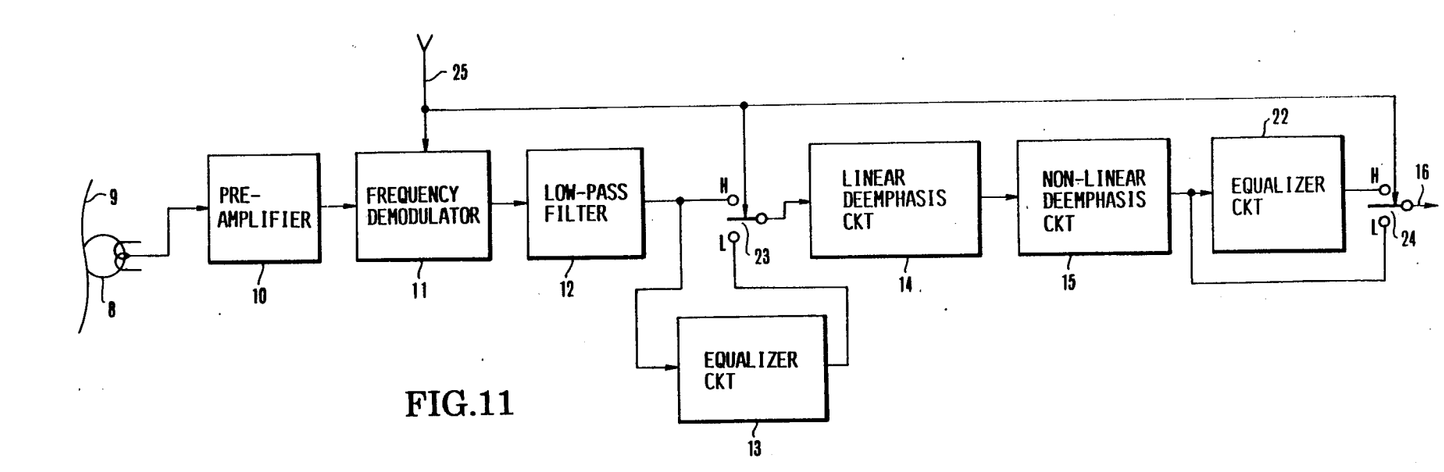
FIG. 11 is a schematic diagram of the construction of a reproducing apparatus to which the invention is applied as another embodiment of the invention.

FIG. 11 schematically shows another embodiment of the reproducing apparatus according to the invention. Incidentally, in FIG. 11, the like parts to those shown in FIG. 1 and FIG. 9 are denoted by the same numerals and their detailed explanation is omitted.

Figure 13A:
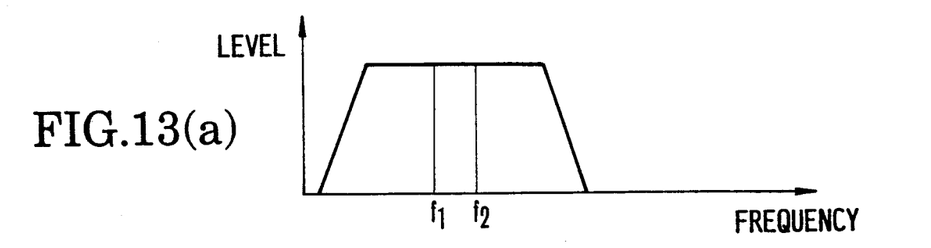
FIGS. 13(a) and 13(b) are graphs of the frequency spectra of the frequency-modulated luminance signal reproduced by the reproducing apparatus shown in FIG. 11.
Figure 13B:
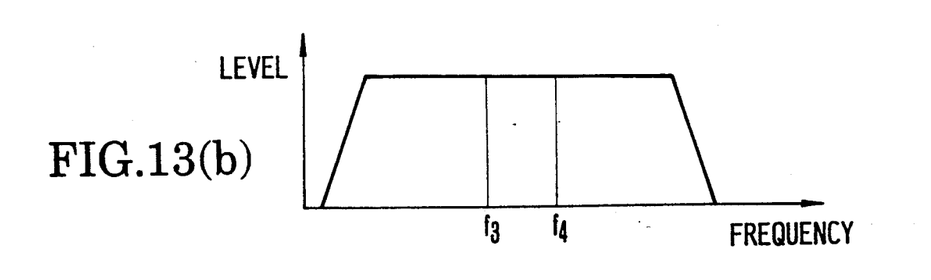

In the embodiment shown in FIG. 11, the apparatus uses a magnetic recording medium 9 on which the luminance signal that was frequency-modulated based on different deviations $f_1 \sim f_2$ and $f_3 \sim f_4$ as shown in FIGS. 13(a) and 13(b) was recorded, when that luminance signal is reproduced.

In FIG. 11, the operation of switches 23 and 24 is controlled by a reproduction mode indicating signal inputted from a system controller (not shown) to an input terminal.25 in such a manner that when reproducing the frequency modulated luminance signal of the form shown in FIG. 13(a) from the magnetic recording medium 9, they are set in their L sides, and when reproducing the frequency-modulated luminance signal of the form shown in FIG. 13(b), they are moved to their H sides.

The reproduction mode indicating signal entering at the aforesaid input terminal 25 is also supplied to the frequency demodulator 11. Thereby the frequency demodulator 11 is changed over between two settings for the frequency demodulations corresponding to the signals of FIGS. 13(a) and 13(b).

In the reproducing apparatus of FIG. 11, for the frequency-modulated luminance signal of the form shown in FIG. 13(a), in other words, the signal of so low resolution that the edge portion of the reproduced signal waveform is not conspicuously influenced by the noise components, great stress has to be laid on the phase characteristic of the signal. From this reason, the equalizer circuit 13 is arranged just after the LPF 12. For the frequency-modulated signal of the form shown in FIG. 13(b), in other words, the signal of so high resolution that the influence of the noise component becomes conspicuous in the edge portion of the reproduced signal wave form, it is of great importance to diminish the noise component. From this reason, the equalizer circuit 22 is arranged just after the non-linear deemphasis circuit 15. Hence, the noise component is diminished in a similar way to that in the before-described apparatus of FIG. 9.

Thus, the embodiment shown in FIG. 11 is able to process the signal in the adaptive manner to the form of the signal to be reproduced.

Also, in the present embodiment, the reproduction mode indicating signal to be reproduced from the system controller (not shown) may otherwise be formed in response to indication of the reproduction mode given to, the system controller manually on a console (not shown), or in automatic response to discrimination of the forms of the signal recorded on the magnetic recording medium, when the reproduction mode is operated.

As has been described above, according to the invention, it is made possible to provide a signal processing apparatus which enables the stable signal to be restored by obviating the influence of noise.

What is claimed is:

1. A signal processing apparatus in which a first frequency-modulated signal, which has been formed by applying an emphasis-processing to a signal on the basis of a predetermined emphasis characteristic at the time of sending out said signal and then frequency-modulating said emphasis-processed signal in a first deviation, and a second frequency-modulated signal, which has been formed by frequency-modulating the emphasis-processed signal in a second deviation different from said first deviation, are selectively received and an original signal is restored from said received first or second frequency-modulated signal, comprising:

(A) frequency demodulating means for demodulating the received first or second frequency-modulated signal and outputting the demodulated signal;

(B) separating means for separating and outputting a signal of a predetermined frequency band from the signal outputted from said frequency demodulating means;

(C) first phase compensating means arranged to input the signal outputted from said separating means and to apply phase compensating processing to said inputted signal and then output the phase-compensated signal in the case where the inputted signal is a signal which has been separated by said separating means from the demodulated signal demodulated from said first frequency-modulated signal by said frequency-modulating means or to output the signal, without applying the phase compensating processing to said inputted signal, in the case where the inputted signal is a signal which has been separated by said separating means from the demodulated signal demodulated from said second frequency-modulated signal by said frequency demodulating means;

D) deemphasis means arranged to input the signal outputted from said first phase compensating means, to apply deemphasis-processing to the inputted signal on the basis of a predetermined deemphasis characteristic corresponding to said emphasis characteristic, and to output the deemphasis-processed signal; and (E) second phase compensating means arranged to input the signal outputted from said deemphasis means, and to apply the phase compensating processing to said inputted signal and output the phase compensated signal in the case where the inputted signal is a signal which has been separated by said separating means from the signal which is demodulated from said second frequency-modulated signal by said frequency modulating means or to output the inputted signal, without applying the phase compensating processing to said inputted signal, in the case where said inputted signal is a signal which has been separated by said separating means from the signal which is demodulated from said first frequency-modulated signal by said frequency-modulating means.

2. An apparatus according to claim 1, wherein said second deviation is wider than said first deviation.

* * * * *

UNITED STATES PATENT AND TRADEMARK OFFICE
CERTIFICATE OF CORRECTION

PATENT NO. : 5,194,998
DATED : March 16, 1993
INVENTOR(S) : Somei Kawasaki

It is certified that error appears in the above-identified patent and that said Letters Patent is hereby corrected as shown below:

| | |
|---|---|
| Col. 2, line 7 | After "quantity" insert -- will -- |
| Col. 2, line 24 | Change "$r_1 > r_2.$" to -- $r_1 \gg r_2.$ -- |
| Col. 2, line 29 | After "chosen," insert -- the temperature -- |
| Col. 5, line 23 | Change "steeply rose" to -- rose steeply -- |
| Col. 5, line 65, 66 | Change "perfectly be compensated" to -- be compensated perfectly -- |
| Col. 6, line 11 | Change "$R1 > R2.$" to -- $R1 \ll R2.$ -- |
| Col. 6, line 45, 52 | Change "From" to -- For -- |

Signed and Sealed this

Thirtieth Day of November, 1993

Attest:

BRUCE LEHMAN

*Attesting Officer*  *Commissioner of Patents and Trademarks*